Figure 1:
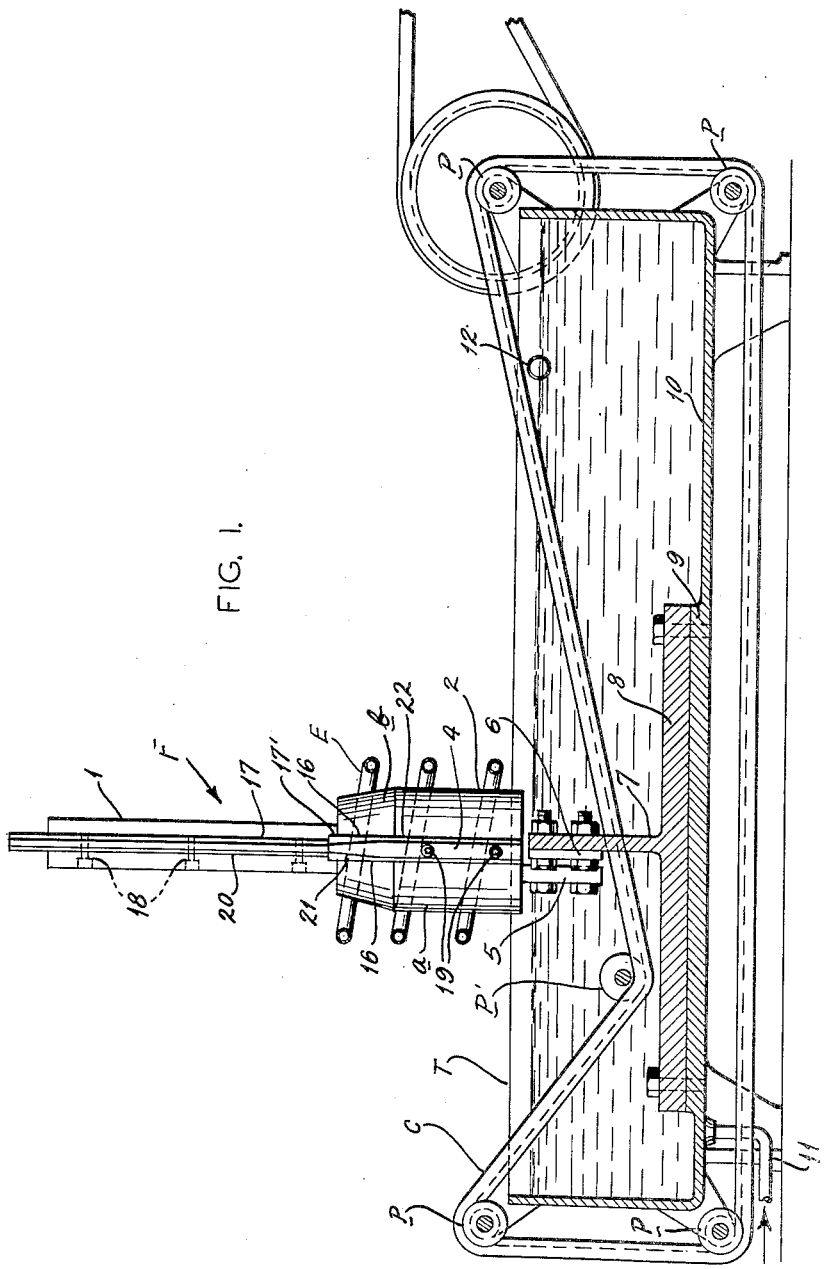

Dec. 4, 1951 — M. W. MARIEN ET AL — 2,577,139
METHOD FOR HEAT-SHAPING PISTON RINGS
Original Filed Sept. 15, 1947 — 2 SHEETS—SHEET 1

FIG. I.

INVENTORS:
MELVIN W. MARIEN
CARL E. LIPPMANN
BY
ATTORNEY.

Dec. 4, 1951 — M. W. MARIEN ET AL — 2,577,139
METHOD FOR HEAT-SHAPING PISTON RINGS
Original Filed Sept. 15, 1947 — 2 SHEETS—SHEET 2
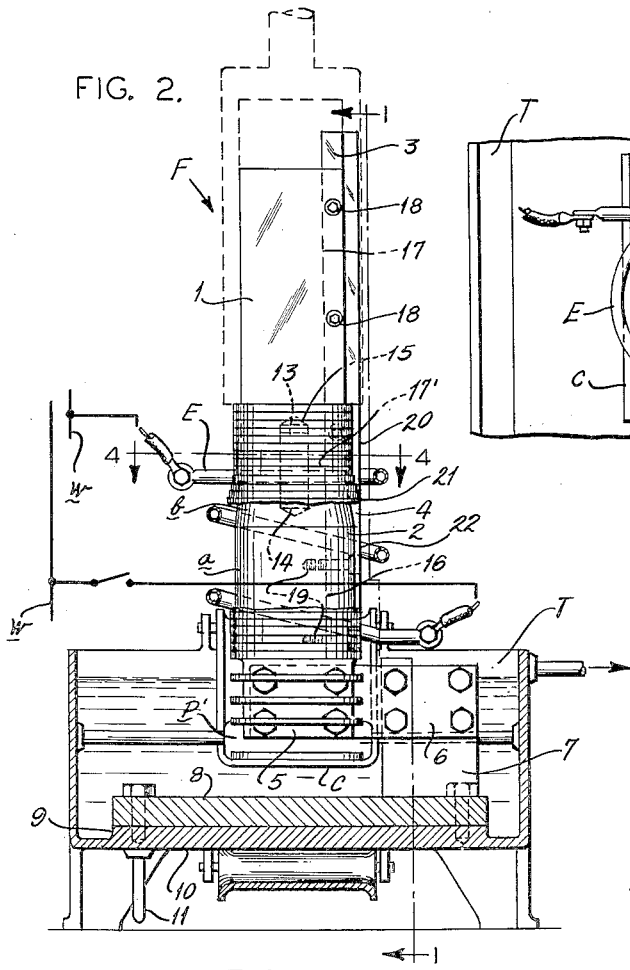
FIG. 2.
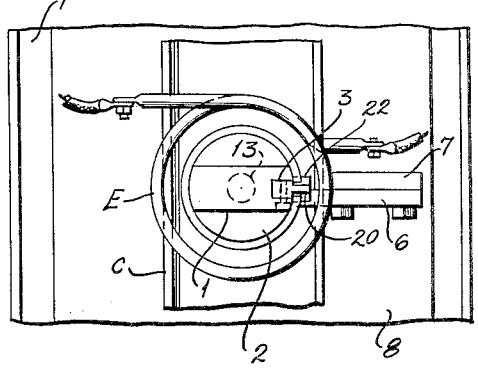
FIG. 3.
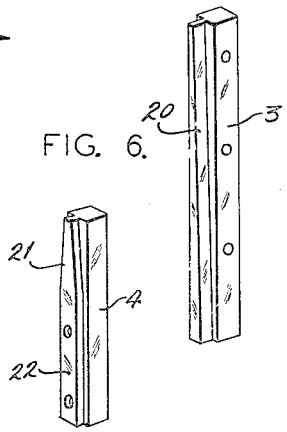
FIG. 5.
FIG. 6.
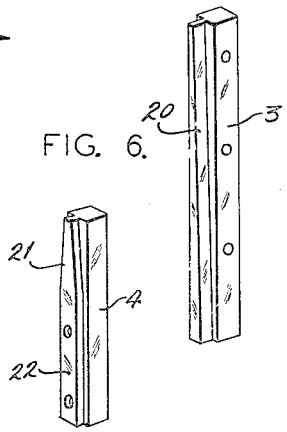
FIG. 4.
INVENTORS:
MELVIN W. MARIEN
CARL E. LIPPMANN
BY Harry A. Benn
ATTORNEY.

Patented Dec. 4, 1951

2,577,139

UNITED STATES PATENT OFFICE 2,577,139

METHOD FOR HEAT-SHAPING PISTON RINGS

Melvin W. Marien and Carl E. Lippmann, St. Louis, Mo., assignors, by mesne assignments, to Ramsey Corporation, a corporation of Ohio Original application September 15, 1947, Serial No. 774,002. Divided and this application July 16, 1948, Serial No. 38,958

1 Claim. (Cl. 219—13)

Our invention has relation to improvements in methods of heat-shaping cast iron piston rings and it consists in the novel features more fully set forth in the specification and pointed out in the claim.

The principal object of the invention (the subject matter of which is divided out of our application Serial No. 774,002, filed September 15, 1947, now Patent Number 2,465,897) is to heat the piston rings by electrical induction while they are held in proper shape by passage over a suitable form. The form is the essential part of a fixture on which the rings are loaded and continuously advanced past the induction coil to ultimately discharge on to a conveyor passing through a cooling medium.

We are aware that the heat-treating of piston rings is old in the art but as far as we know the continuous passage of piston rings over a suitable form while undergoing the heat treatment for the shaping of the rings is novel and together with the fixture employed forms the subject matter of the present invention.

The above objects, together with other advantages of the invention, will be better apparent from a detailed description thereof in connection with the accompanying drawings, in which:

Figure 1 is a side elevation of our improved fixture mounted in a suitable cooling tank (shown in section) through which a suitable conveyor passes for continuously carrying the rings away after treatment. Figure 2 is a side elevation taken at right angles to Figure 1 also showing the cooling tank in section and the conveyor for the rings. Figure 3 is a top plan of the fixture over which the rings are passed during heat treatment. Figure 4 is a horizontal cross section taken on the line 4—4 of Figure 2. Figure 5 is a perspective view of the bar for aligning the ring gaps as the rings pass over the loading fixture and Figure 6 is a perspective view of the lining bar for the rings as they pass on to a forming element where they undergo the heat treatment.

Referring to the drawings, F represents the fixture as a whole which comprises a loader 1, a forming element 2, an upper lining bar 3 and a lower lining bar 4. A lug 5 depends from the forming element 2 and is secured by a plate 6 to a standard 7 extending upwardly from base 8. The base 8 is secured to a boss 9 on the bottom 10 of quenching tank T which has a fluid inlet pipe 11 and an overflow pipe 12 to maintain a constant level of water or other quenching medium. An endless conveyor C is carried by pulleys p, p, p, p mounted at each corner of the tank so that the conveyor will travel beneath the forming element 2 and receive the rings as they discharge therefrom and carry them through the cooling medium to be ultimately discharged from the conveyor in any well-known manner.

The essence of the invention is the method of employing the fixture F over which rings R are passed and subjected to the heat of an induction coil E which surrounds the forming element 2 in sufficiently spaced relation to permit the free passage of the rings over the element 2 and within the coil E. The induction coil E is connected to a source of electrical energy represented by line wires w, w. The forming element 2 comprises a lower cylindrical portion a, and an upper frustro-conical section b, upon the latter of which is disposed, and which we choose to term, a loader 1 held in place thereon by a center pin 13 disposed in a socket 14 in the forming element and a socket 15 in the loader. The forming element 2 is provided with a longitudinally disposed slot 16 and the loader is provided with a slot 17 to register with the slot 16, the lower part of slot 17 being enlarged as shown at 17' to register with the slot 16 in the forming element. The liner bar 3 is secured in slot 17 by screws 18 and the lower lining bar 4 is secured in slot 16 by screws 19, this latter bar extending upwardly into the enlargement 17' of slot 17. It will be observed that the bar 3 has a rib 20 extending outwardly from it, being tapered outwardly from the top to the bottom of said bar, and articulating with the tapered upper end 21 of rib 22 extending laterally from the lower lining bar 4. Thus, it will be apparent that the ribs 20 and 21 are coextensive and gradually taper outwardly until they come opposite to the cylindrical portion a of forming element 2, opposite the entire extent of which the rib 22 is of uniform width. The purpose of this tapering construction of the combined forming bars is to facilitate the disposition of the rings on the loader 1 with their gaps embracing the liner bar. As the rings are forced downwardly over the loader 1 their gaps will encounter the gradually increasing width of the liner bar until the rings enter upon the forming element 2 at which time the gaps will have been expanded to their normal dimension and the rings will be in position for shaping under the heat imparted by the induction coil E.

The forming element 2 may be of any desired shape that ultimately is to be imparted to the piston rings. Of course, the shape generally sought is that which will give the rings uniform radial tension in action. Heretofore, this shape has generally been accomplished by making individual ring castings. Under our improved method the rings may be cut from a hollow cylinder and subsequently shaped under heat on the desired form.

It will be observed that the forming element 2 is of solid metallic construction and will, therefore, store up heat from the induction coil E. Therefore, as the rings pass over the element 2 they will be exposed to both the heat of the coil on the outside and the heat of the element on the inside. The heating of the rings while under tension on the forming element and also under a limited lateral restraint will set them in their final shape in a matter of seconds.

It is quite obvious that many methods of advancing the ring column over the fixture F may be utilized other than a mere manual feeding thereof. Such feed mechanism forms no part of the present invention and is not shown in detail. However, B indicates conventionally a plunger of any available automatic feed.

Having described our invention, we claim:

A method of shaping iron piston rings which comprises passing a plurality of the rings continuously over a forming mandrel, subjecting the forming mandrel and the rings while under stress and while moving over said mandrel to heat induced by electric induction to cause said stress to be relieved and the rings to conform to the contour of the forming mandrel, said heat being controlled within limits at which the internal structure of the iron will not be materially altered.

MELVIN W. MARIEN.
CARL E. LIPPMANN.

REFERENCES CITED

The following references are of record in the file of this patent:

UNITED STATES PATENTS

| Number | Name | Date |
|---|---|---|
| 606,675 | Marcy | July 5, 1898 |
| 1,450,346 | Anderson | Apr. 3, 1923 |
| 1,619,296 | Graves | Mar. 1, 1927 |
| 1,836,112 | Ganster | Dec. 15, 1931 |
| 2,336,462 | Bristow | Dec. 14, 1943 |
| 2,417,610 | Phillips | Mar. 18, 1947 |
| 2,453,330 | Marshall | Nov. 9, 1948 |
| 2,461,323 | Hille | Feb. 8, 1949 |
| 2,480,315 | Bennett | Aug. 30, 1949 |